United States Patent [19]

Giger et al.

[11] 4,057,885

[45] Nov. 15, 1977

[54] METHOD OF PRODUCING AN OSCILLATING WEIGHT FOR AUTOMATIC TIMEPIECES

[75] Inventors: Urs Giger, Solothurn; Friedrich Perrot, Lengnau, both of Switzerland

[73] Assignee: Eta A.G. Ebauches-Fabrik, Switzerland

[21] Appl. No.: 686,068

[22] Filed: May 13, 1976

[30] Foreign Application Priority Data

May 30, 1975 Switzerland ........................ 7030/75

[51] Int. Cl.[2] ........................ B23P 13/00; B23P 11/00

[52] U.S. Cl. ........................................ 29/177; 29/509; 29/520; 29/522 R; 58/107

[58] Field of Search ................. 29/177, 178, 509, 520, 29/522, 511; 58/107, 117, 28

[56] References Cited

U.S. PATENT DOCUMENTS

| | | | |
|---|---|---|---|
| 544,883 | 8/1895 | Church | 58/107 |
| 2,936,571 | 5/1960 | Biemiller | 58/107 X |
| 3,187,427 | 6/1965 | Double | 29/520 X |
| 3,191,268 | 6/1965 | Matea | 29/520 |
| 3,314,138 | 4/1967 | Double | 29/522 X |

FOREIGN PATENT DOCUMENTS

| | | | |
|---|---|---|---|
| 1,913,647 | 9/1970 | Germany | 58/107 |
| 287,614 | 4/1953 | Switzerland | 29/177 |
| 225,819 | 6/1943 | Switzerland | 29/509 |
| 279,359 | 3/1952 | Switzerland | 29/177 |

*Primary Examiner*—Victor A. DiPalma
*Attorney, Agent, or Firm*—Stevens, Davis, Miller & Mosher

[57] ABSTRACT

A method of producing an oscillating weight for an automatic wristwatch. The oscillating weightcomprises a heavy-metal segment and a metallic center portion having a flanged rim. For attaching the center portion to the heavy-metal segment, an arcuate groove is formed in the upper surface of the segment, the flanged rim of the center portion is axially inserted in the groove which is slightly wider than the flanged rim, and at one or more locations a portion of the segment is wedged over the rim or a portion of the rim is wedged in the groove by exerting a localized pressure substantially at right angles to the plane of the center portion.

5 Claims, 3 Drawing Figures

METHOD OF PRODUCING AN OSCILLATING WEIGHT FOR AUTOMATIC TIMEPIECES

This invention relates to a method of producing an automatic timepiece oscillating weight of the type comprising a heavy-metal segment and a metallic center portion having a flanged rim, wherein an arcuate groove is formed in the upper face of the segment adjacent to the periphery thereof, the flanged rim of the center portion is axially inserted in the groove, and portions of the segment and of the flanged rim are wedged together at at least one location for rigidly connecting the center portion to the segment.

Oscillating weights have been disclosed, e.g., in Swiss Pat. No. 279,359 and in Swiss Published application No. 4378/61, in which the heavy-metal segment is secured to the center portion by means of pins or screws or by riveting. When these known oscillating weights are assembled, the holes in the segment must be precisely aligned with the holes in or the rivets of the center portion in order that the pins, screws, or rivets may be inserted in the corresponding openings. The alignment operation is time-consuming and thus adds to the cost of producing such oscillating weights.

It has already been proposed in Swiss Pat. No. 287,614 to press the bent-over edge of the center portion into an axially running groove in the segment. Even though there are no holes for the insertion of screws or rivets, the center portion and the segment must nevertheless be precisely aligned with one another for pressing the edge of the center portion into the groove. Furthermore, a relatively great amount of force is required to press in the entire edge of the center portion, and this may have an adverse effect upon the center portion or the heavy-metal segment or both, in that these parts may be deformed.

It is an object of this invention to provide a method of producing an oscillating weight of the kind described above in which the segment need not be so precisely aligned with the center portion as has heretofore been the case, and in which less force need be applied.

To this end, the method according to the present invention comprises the steps of forming the groove slightly wider than the flanged rim to be inserted therein for facilitating assembly, and wedging the segment portion over the rim portion or the rim portion under the segment portion by means of localized pressure exerted substantially at right angles to the plane of the center portion.

Figure 1:
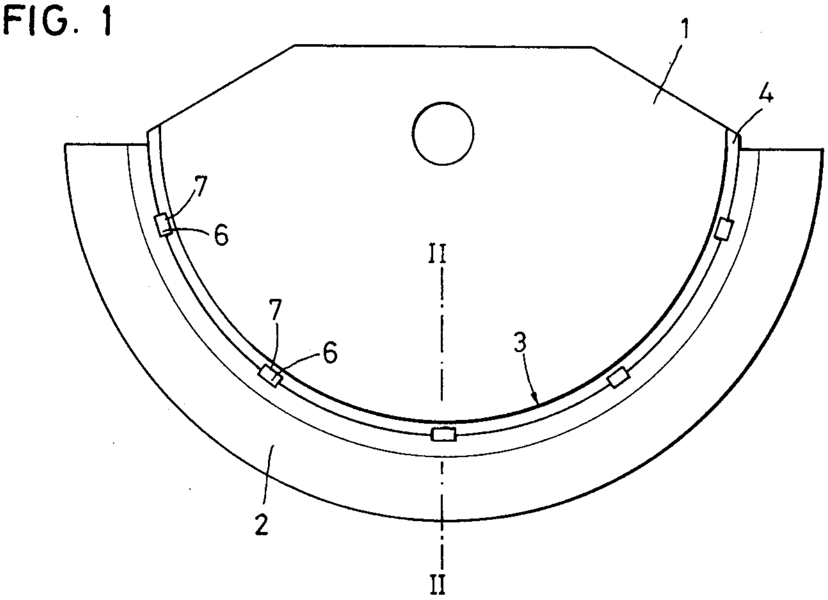
Figure 2:
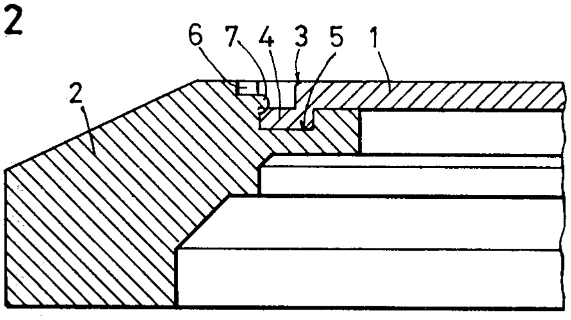
Figure 3:
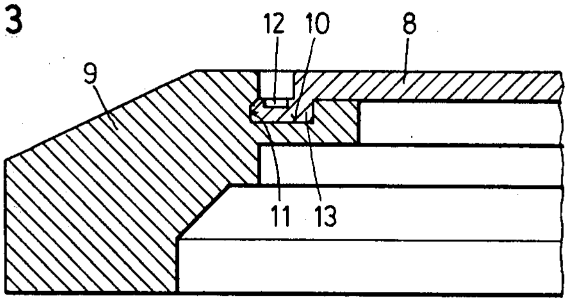

Two preferred embodiments of the invention will now be described in detail with reference to the accompanying drawing, in which:

FIG. 1 is a top plan view of an oscillating weight produced in accordance with one embodiment of the invention, FIG. 2 is a section taken on the line II—II of FIG. 1, on a larger scale, and FIG. 3 is a section similar to FIG. 2 through an oscillating weight produced in accordance with another embodiment of the invention.

The oscillating weight illustrated in FIGS. 1 and 2 comprises a center portion 1 and a heavy-metal segment 2. The center portion 1 may, for example, be made of brass, steel, or a nickel alloy and the segment 2 of tungsten or a tungsten alloy. The center portion 1 has an arcuate edge extending over an angle of rotation of approximately 180°. In line with the center of the edge 3 is an opening for receiving an arbor (not shown) forming the axis of rotation of the oscillating weight. FIG. 2 shows clearly that the edge 3 of the center portion 1 is bent twice at right angles to form a semicircular flanged rim 4.

The heavy-metal segment 2 is likewise arcuate and extends over somewhat less than 180°. The reason for this is that two heavy-metal segments are produced from one annular piece, having the same profile as the segment 2, by using a milling cutter to divide it along its diameter. An arcuate groove 5 extends axially into the segment 2 for receiving the flanged rim 4 of the center portion 1. The groove 5 is slightly wider than the rim 4 so that the latter can be inserted axially into the former without the use of force.

For rigidly connecting the segment 2 to the center portion 1, the outer edge of the groove 5 has been peened or wedged over at several locations by means of a tool (not shown) having a rectangular profile, this tool having pressed depressions 6 into the segment 2. In the vicinity of each depression 6, the material of which the segment 2 is made has been deformed into a nose 7. During this operation, the noses 7 have been partially pressed into the material of which the center portion 1 is made, thereby causing the material of the flanged rim 4 to fill up the remainder of the groove 5 completely in the vicinity of each depression 6. By means of this method of attachment, the inner cylindrical side face of the rim 4 is pressed against the inner wall of the groove 5 over its entire length, thereby achieving in a simple manner a precise centering of the segment 2 with respect to the center portion 1.

FIG. 3 illustrates a further embodiment in cross-section. A center portion 8 is made similar in form to the center portion 1 of the embodiment shown in FIGS. 1 and 2. A heavy-metal segment 9 is also shaped similarly to the segment 2 of the first embodiment. An arcuate groove 10 includes an undercut portion 11. For rigidly connecting the segment 9, a depression 12 is stamped into a flanged rim 13 at each of several locations with the aforementioned tool. The material of the rim 13 thus displaced completely fills up the groove 10 and the undercut 11, the inner cylindrical side face of the rim 13 once more being pressed against the inner sidewall of the groove 10, and the segment 9 thereby being precisely centered with respect to the center portion 8.

The heavy-metal segments 2 and 9 and the center portions 1 and 8 are very easily produced; what is essential is only that the radii of the inner cylindrical side faces of the flanged rims 4 and 13 and the inner walls of the grooves 5 and 10 be at least approximately equal so that an optimum centering effect is obtained.

The heavy-metal segments and the center portions can be assembled with a solely axially-directed motion, and there is no necessity for giving particular heed to a precise angular positioning of the two components. Hence the oscillating weights described above can be efficiently assembled and rigidly connected by mechanical means, and both costly welding equipment and the feed of screws, rivet pins, or adhesive may be dispensed with.

What is claimed is:

1. In a method of producing an automatic timepiece oscillating weight of the type comprising a heavy-metal segment and a metallic center portion having a flanged rim, wherein an arcuate groove is formed in the upper face of the segment adjacent to the periphery thereof, the flanged rim of the center portion is axially inserted in the groove, and portions of the segment and of the flanged rim are wedged together at at least two mutually spaced spots for rigidly connecting the center portion to the segment, the improvement comprising the steps of:

forming the groove slightly wider than the flanged rim to be inserted therein for facilitating assembly, and wedging the segment portion over the rim portion or the rim portion under the segment portion by means of localized pressure exerted substantially at right angles to the plane of the center portion.

2. The method of claim 1, comprising the step of pressing a depression into the outer edge of the groove, thereby deforming the material of the segment beneath the depression to form a nose wedged partially over the rim and substantially filling the groove with the material of the center portion in the vicinity of the depression.

3. The method of claim 1, comprising the steps of undercutting the outer side of the groove and pressing a depression into the flanged rim inserted in the groove, thereby displacing marerial of the rim and substantially filling the groove together with the undercut with the displaced material in the vicinity of the depression.

4. The method of claim 1, comprising the step of forming the flanged rim by bending the edge of the center portion twice at right angles.

5. The method of claim 4, comprising the step of making the radius of the inner cylindrical side face of the flanged rim equal to the radius of the inner sidewall of the groove, thereby obtaining a centering effect of the segment with respect to the center portion during the wedging step.

* * * * *